US006080229A

United States Patent [19]

Watanabe et al.

[11] Patent Number: 6,080,229

[45] Date of Patent: Jun. 27, 2000

[54] REACTION SOLUTION FOR INK JET RECORDING METHOD USING TWO LIQUIDS

[75] Inventors: Kazuaki Watanabe; Yukari Sano, both of Suwa, Japan

[73] Assignee: Seiko Epson Corporation, Tokyo-To, Japan

[21] Appl. No.: 08/839,674

[22] Filed: Apr. 15, 1997

[30] Foreign Application Priority Data

| | | | |
|---|---|---|---|
| Apr. 16, 1996 | [JP] | Japan | 8-094561 |
| Jul. 18, 1996 | [JP] | Japan | 8-189763 |
| Aug. 19, 1996 | [JP] | Japan | 8-217661 |

[51] Int. Cl.[7] .......... C09D 11/00

[52] U.S. Cl. .......... 106/31.43; 106/31.58; 106/31.75; 106/31.86

[58] Field of Search .......... 106/31.58, 31.86, 106/31.43, 31.75, 31.47, 31.49, 31.77, 31.78

[56] References Cited

U.S. PATENT DOCUMENTS

| | | | |
|---|---|---|---|
| 5,746,818 | 5/1998 | Yatake | 106/31.86 |
| 5,764,261 | 6/1998 | Koike et al. | 106/31.13 |
| 5,846,306 | 12/1998 | Kubota et al. | 106/31.75 |

FOREIGN PATENT DOCUMENTS

| | | |
|---|---|---|
| 588316 | 3/1994 | European Pat. Off. . |
| 673782 | 9/1995 | European Pat. Off. . |
| 674232 | 9/1995 | European Pat. Off. . |
| 2155815 | 10/1985 | United Kingdom . |
| 2134129 | 8/1994 | United Kingdom . |

*Primary Examiner*—Mark L. Bell
*Assistant Examiner*—Veronica F. Faison
*Attorney, Agent, or Firm*—Ladas & Parry

[57] ABSTRACT

A reaction solution for use in ink jet recording, wherein a reaction solution and an ink composition are deposited onto a recording medium to perform printing, is provided, This reaction solution possesses -improved storage stability, can improve printing stability, and, in addition, can offer a printed image having improved quality. It comprised at least a polyvalent metallic salt and a component selected from the group consisting of a five- or six-membered saturated or unsaturated, heterocyclic compound containing at least one nitrogen atom, an optionally alkyl-substituted amide derivative, a sulfur-containing compound, an amine, and a cationic surfactant.

20 Claims, 4 Drawing Sheets

REACTION SOLUTION FOR INK JET RECORDING METHOD USING TWO LIQUIDS

BACKGROUND OF THE INVENTION

1. Field of the Invention

The present invention relates to an ink jet recording method wherein both a reaction solution and an ink composition are deposited onto a recording medium, and also relates to the reaction solution used in the ink jet recording method.

2. Background Art

An ink jet recording method is a printing method wherein droplets of an ink composition are ejected and deposited onto a recording medium such as paper. This method has a feature that an image having a high resolution and a high quality can be realized at a high speed with a relatively inexpensive apparatus. In general, the ink composition used in the ink jet recording method comprises water as a main component and, added thereto, a colorant and a wetting agent such as glycerin added for prevention of clogging and other purposes.

On the other hand, a new ink jet recording method has been recently proposed. The new method comprises applying a polyvalent metal salt solution onto a recording medium and then applying an ink composition containing a dye having at least one carboxyl group (e.g., Japanese Patent Laid-Open No 202328/1993). According to this method, polyvalent metal ions combine with the dye to form an insoluble composite which can provide an image having water resistances and a high quality free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or coagulation, thereby providing a high-quality color image having a high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open No. 240557/1991 and No. 240558/1991.

SUMMARY OF THE INVENTION

The present inventors have now found that the presence of a particular compound in a reaction solution containing a polyvalent metal salt for use in ink jet recording involving the step of printing of two liquids results in improved storage stability of the reaction solution, improved printing stability, in addition, can offer an image having improved quality. The present invention has been made based on such finding.

Accordingly, an object of the present invention is to provide a good reaction solution for use in ink jet recording involving the step of printing of two liquids.

Another object of the present invention is to provide an ink jet recording method, involving the step of printing of two liquids, which does not cause clogging and can realize a good printed image.

According to one aspect of the present invention, there is provided a reaction solution for use in ink jet recording wherein a reaction solution and an ink composition are deposited onto a recording medium, said reaction solution comprising at least a polyvalent metallic salt and a component selected from the group consisting of a five- or six-membered saturated or unsaturated heterocyclic compound containing at least one nitrogen atom, an optionally alkyl-substituted amide derivative, a sulfur-containing compound, an amine, and a cationic surfactant.

According to another aspect of the present invention, there is provided an ink jet recording method wherein the above reaction solution is used.

DETAILED DESCRIPTION OF THE INVENTION

Ink jet recording method

Figure 1:
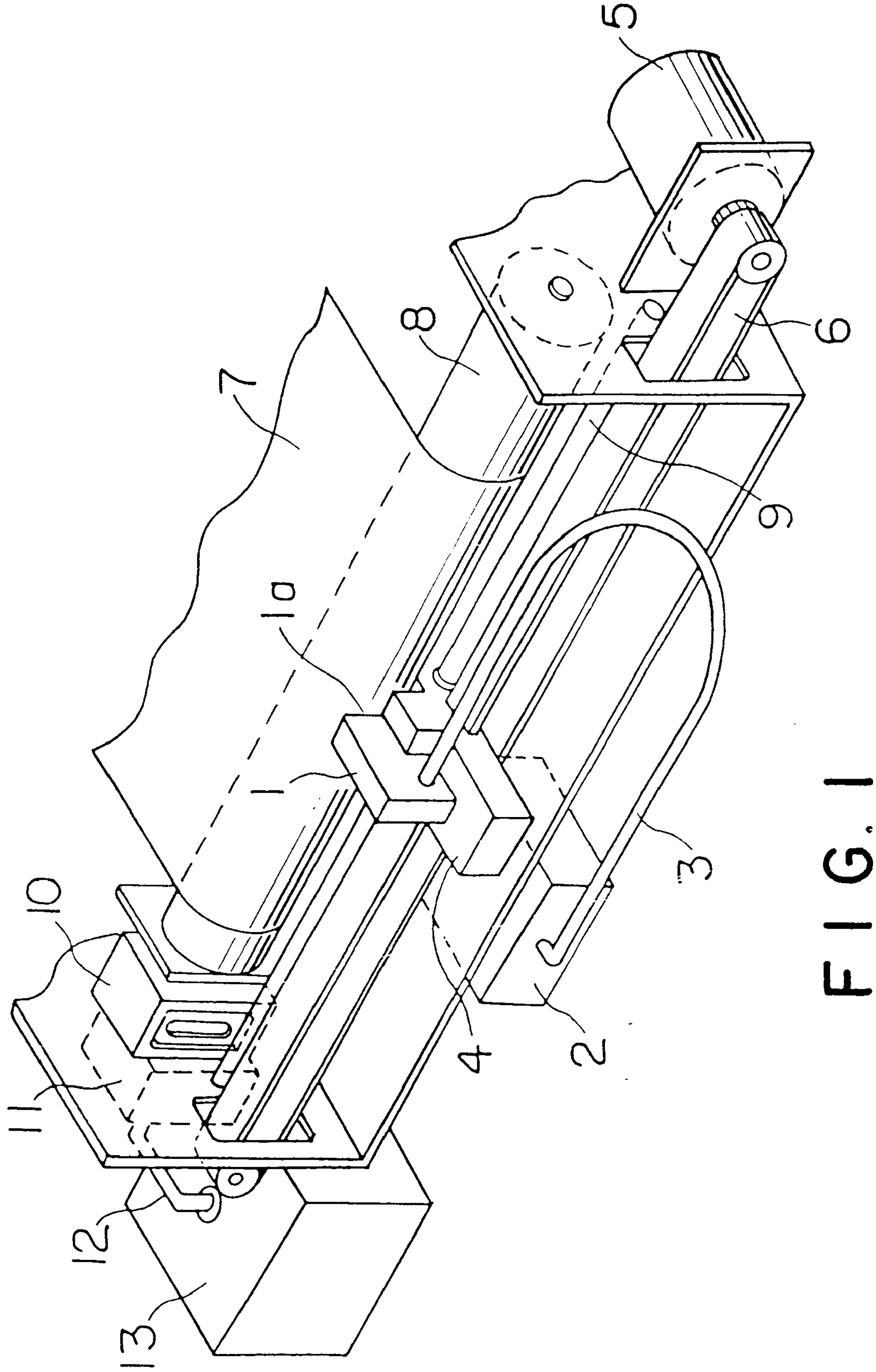
FIG. 1 shows an embodiment of the ink jet recording apparatus according to the present invention, wherein a recording head is provided separately from an ink tank to feed an ink composition and a reaction solution into a recording head through an ink tube.

The ink jet recording method according to the present invention comprises the step of printing a reaction solution and an ink composition on a recording medium.

The reaction solution and the ink composition may be applied on a recording medium in any sequence. Specifically, any of the following methods may be suitably used: a method wherein a reaction solution is deposited onto a recording medium followed by deposition of an ink composition onto the recording medium with the reaction solution deposited thereon, a method wherein an ink composition is printed followed by deposition of the reaction solution, and a, method wherein a reaction solution and, an ink composition are mixed together immediately before or immediately after ejection thereof.

According to the ink jet recording method of the present invention, good printing can be realized by bringing a reaction solution into contact with an ink composition. Although the present invention is not intended to be bound by the following hypothesis, the reason why good printing can be achieved by the present invention is believed as follows. Upon contact of the reaction solution with the ink composition, the polyvalent metal ion contained in the reaction solution breaks the state of dispersion of a colorant and other ingredients, resulting in agglomeration of these ingredients. The agglomerates are deposited onto the recording medium, and thus an image having high color density and free from feathering and uneven printing could be realized. Further, in a color image, uneven color mixing in boundaries of different colors, that is, color bleeding, can also be advantageously prevented.

The deposition of the reaction solution onto the recording medium may be carried out by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

Reaction solution

The reaction solution used in the present invention basically comprises at least a polyvalent metallic salt and a component selected from the group consisting of a five- or six-membered saturated or unsaturated heterocyclic compound containing at least one nitrogen atom, an optionally alkyl-substituted amide derivative, a sulfur-containing compounds an amine, and a cationic surfactant.

Polyvalent metal salt

The polyvalent metal salt usable in the reaction solution is constituted by divalent or higher polyvalent metallic ions and anions bonded to the polyvalent metallic ions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$ . Anions include $Cl^-$, $NO_3^-$, $I^-$, $Br^-$, $ClO_3^-$, and $CH_3COO^-$.

Especially, a metal salt constituted by $Ca^{2+}$ or $Mg^{2+}$ provides favorable results in terms of pH of the reaction solution and the quality of prints.

The concentration of the polyvalent metal salt In the reaction solution may be suitably determined so as to attain the effect of providing a good print quality and preventing clogging. It, however, is preferably about 0.1 to 40% by weight, more preferably about 5 to 25% by weight.

According to the present invention, the polyvalent metal salt contained in the reaction solution may comprise a divalent or higher polyvalent metal ion and an ion bonded to the polyvalent metal, preferably a nitrate ion or a carboxylate ion and is soluble in water.

Furthermore, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Reaction solution containing nitrogen-containing compound or sulfur-containing compound According to a first embodiment of the present invention, there is provided a reaction solution comprising a nitrogen-containing compound or a sulfur-containing compound. The term "nitrogen-containing compound" used herein refers to a five- or six-membered saturated or unsaturated heterocyclic compound containing at least one nitrogen atom and an optionally alkyl-substituted amide derivative. The reaction solution containing a nitrogen-containing compound or a sulfur-containing compound is less likely to generate deposits during storage of the reaction solution. The presence of the nitrogen-containing compound or the sulfur-containing compound is considered to inhibit the occurrence of deposits. When the nitrogen-containing compound or the sulfur-containing compound is absent, the occurrence of deposits having a size of about 10 to 50 μm is often observed in a reaction solution during storage, especially in a reaction solution which has been once exposed to a high temperature (for example, a temperature above 60° C.). The occurrence of such deposits is causative of clogging of nozzles in an ink jet recording head. Incorporation of a nitrogen-containing compound or a sulfur-containing compound into a reaction solution containing a polyvalent metal salt can offer an advantage that any deposit is not substantially produced in the reaction solution during storage, especially in the reaction solution exposed to the above high temperature. This contributes to an improvement in reliability of the ink jet recording method.

The reason why the presence of a nitrogen-containing compound or a sulfur-containing compound can inhibit the occurrence of deposits has not been elucidated yet, it is believed to reside in that ion species causative of the occurrence of the deposit are stabilized by the action of an unpaired electron possessed by the nitrogen or sulfur atom. This, however, is merely hypothetical, and the present invention should not be construed to be limited by the hypothesis.

Preferred examples of five- or six-membered saturated or unsaturated heterocyclic compounds containing at least one nitrogen atom include five- or six-membered saturated compounds, such as pyrrolidine and piperidine,, five- or six-membered unsaturated compounds, such as pyrrole, imidazole, pyrazole, pyridine, pyridazine, pyrimidine, and pyrazine. Preferred examples of (alkyl-substituted) amide derivatives include pyrrolidone, N-substituted pyrrolidone, imidazolidinone, and N-substituted imidazolidinone. Specific examples of more preferred examples thereof include 2-pyrrolidone, pyrrolidone substituted by an N-lower alkyl (preferably, methyl), 2-imidazolidinone substituted by an 1,3-lower alkyl (preferably, methyl).

Preferred sulfur-containing compounds include thiodiglycols.

The concentration of the nitrogen-containing compound or sulfur-containing compound in the reaction solution may be properly determined so as to attain the effect of providing good print quality and preventing clogging. It, however, is preferably about 0.5 to 20% by weight, more preferably about 2 to 10% by weight.

Amine-containing reaction solution

According to a second embodiment of the present invention, there is provided an amine-containing reaction solution. The addition of the amine can simultaneously improve print quality and printing stability. In this embodiment of the present invention, the amine contained in the reaction solution refers to an ammonia or a compound formed by replacing 1 to 3 hydrogen atoms of ammonia with a hydrophobic hydrocarbon radical, that is, a primary, secondary, or tertiary amine.

According to a preferred embodiment of the present invention, the reaction solution comprises ammonia as the amine. Ammonia, as compared with an amine having a conventional hydrocarbon radical, causes no significant increase in viscosity, when added to the reaction solution, and, in addition, has higher solubility in water. Therefore, it can be added in an amount large enough to satisfy both print quality and printing stability requirements. The addition of ammonia has no significant influence on the surface tension of the reaction solution and, further, does not excessively lower the wetting capability of the reaction solution. Therefore, prints with sharp edge and having high OD can be obtained. Further, the volatile property of ammonia facilitates fast drying of the printed ink image, permitting the dried printed image to have good scratch resistance.

The amount of ammonia added to the reaction solution may be suitably determined by taking into consideration pH of the reaction solution. It, however, is generally not more than 0.5% by weight, preferably not more than 0.1% by weight.

The hydrocarbon radical in the primary, secondary, or tertiary amine may be either a saturated hydrocarbon radical or an unsaturated hydrocarbon radical. Further, it may be of either straight chain or branched chain type.

According to a preferred embodiment of the present invention, the primary amine, wherein a hydrocarbon radical is bonded to an amino group ($—NH_2$), is preferably an amine having a straight-chain hydrocarbon radical, containing about 6 to 18 carbon atoms, more preferably a straight-chain hydrocarbon radical containing about 12 to 18 carbon atoms. Specific examples thereof include laurylamine, cetylamine, and stearylamine. The addition of the above primary amine can offer a combination of print quality and printing stability on a high level.

The amount of the amine added may be suitably determined according to the kind of the amine by taking into consideration the print quality, print stability, and solubility of the amine. In general, however, it is about 0.01 to 1% by weight. Amines having a hydrocarbon radical, of which the number of carbon atoms is small, may be added in a relatively large amount. On the other hand, amines having a hydrocarbon radical, of which the number of carbon atoms is large, have low solubility and increase the viscosity of the reaction solution, and, hence, the amount of these amines added is generally limited.

According to the present invention,, secondary amines and tertiary amines also may be used in the same manner as described above in connection with the primary amine. Examples of secondary and tertiary amines usable herein include secondary amines, such as di-n-propylamine, di-n-butylamine, di-n-amylamine, di-n-octylamine, and distearylamine, and tertiary amines, such as trimethylamine, propyldimethylamine, butyldimethylamine, octyldimethylamine, and stearyl dimethylamine.

It is also possible to use amines with a hydrocarbon radical having a cyclic structure. Examples of such amines include cyclohexylamine, dicyclohexylamine, benzylamine, N-cyclohexyl-n-docecylamine, N-benzyl-n-docecylamine, N-o-tolyl-n-dodecylamine, N-p-tolyl-n-docecylamine.

In the present invention, the term "amine" connotes a cyclic imine. Examples of cyclic imines usable herein include pyrrolidine, piperidine, hexyamethyleneimine, octamethyleneimine, and decamethyleneimine. All of them can offer stable printing. In particular, octamethyleneimine and the like having 8 to 10 methylene chains can offer good effect and, as compared with octylamine and dibutylamine, of which the total number of carbon atoms is identical to that of octamethyleneimine and the like, can markedly improve the printing stability.

According to the present invention, preferably, the amine is added in the form of a salt of an inorganic acid or an amide. Examples of inorganic acids include various inorganic acids, such as nitric acid, nitrous acid, hydrochloric acid, bromic acid, a chromic acid. The addition of the amine in the form of a salt of an inorganic acid can improve the solubility of the amine and, at the same times, can offer improved storage stability and printing stability. Proper selection of the kind of the inorganic acid can prevent the shift of pH on the alkaline side.

Examples of amides usable herein include those prepared by heat-treating a mixture of an amine with a fatty acid. An amine prepared by heat-treating a mixture of $C_nH_{2n+1}NH_2$ with $C_{n-1}H_{2n-1}COOH$, wherein n is an integer (the same shall apply hereinafter), a mixture of $(C_nH_{2n+1})_2NH$ with $C_{n-1}H_{2n-1}COOH$, or a mixture of $(C_nH_{2n+1})_3N$ with $C_{n-1}H_{2n-1}COOH$ can offer the same effect as attained by the addition of the amine to the reaction solution.

Some of the amines containing a hydrocarbon radial having a cyclic structure, the cyclic imine, and the amide have the function of the amine, as well as the function of the nitrogen-containing compound in the reaction solution according to the first embodiment.

Further, according to a preferred embodiment of the present inventions the amine has suitable volatility. An ink composition containing a volatile amine is fast drying on paper and, after drying, can provide a print having good scratch resistance.

According to a preferred embodiment of the present invention, the vapor pressure of the amine is not less than 0.01 Pa at 25° C. Specific examples of such amines include ammonia noted above and dicyclohexylamine nitrate.

Cationic surfactant

According to a third embodiment of the present invention, there is provided a reaction solution comprising a cationic surfactant. As described above, in the ink jet recording method according to the present invention, the polyvalent metal salt contained in the reaction solution breaks the dispersed state of a colorant or the like in the ink composition and agglomerates the colorant component or the like to give an agglomerate which is deposited onto a recording medium, realizing a print having high color density, free from feathering, and good evenness. The addition of the cationic surfactant appears to further accelerate the formation of the agglomerate. This permits the colorant component to be rapidly and surely fixed onto a recording medium, offering a good print. In this connection, it should be noted that the cationic surfactant has high solubility in an aqueous solvent and, hence, can be advantageously used in a high concentration in the reaction solution. Furthermore, the cationic surfactant can serve also as a penetrating agent. This provides an additional advantage that the drying speed of the printed image can also be improved. Furthermore, in the case of a color image, uneven color-to-color mixing in boundaries of different colors, that is, color bleeding, can be effectively prevented.

Cationic surfactants usable in the present invention includes primary, secondary, tertiary, quaternary ammonium salts, derivatives thereof, and sulfate cationic surfactants. A cationic surfactant containing one quaternary nitrogen atom is especially preferred. Further, a cationic surfactant, wherein at least two substituents bonded to the quaternary nitrogen atom each contain 6 or more carbon atoms, is preferred from the viewpoint of high cohesive force.

Specific examples of cationic surfactants usable herein include quaternary ammonium salts represented by the following formula (I):

$$R^1R^2R^3R^4N^+X^- \quad (I)$$

wherein $R^1$ and $R^2$ each independently represent a $C_8$–$C_{20}$ alkyl, benzyl, or phenyl group, $R^3$ and $R^4$ each independently represent a $C_1$–$C_4$ alkyl group, and $X^-$ represents a counter ion.

Specific examples of cationic surfactants represented by the formula (I) include lauryltrimethylammonium chloride, cetyltrimethylammonium chloride, dioctyldimethylammonium chloride, distearyldimethylammonium chloride, octadecyldimethylbenzylammonium chloride, and octadecylamine acetate.

The amount of cationic surfactant added to the reaction solution is not particularly limited. It, however, is preferably about 0.1 to 20% by weight, more preferably about 5 to 10% by weight.

Other ingredients of reaction solution

The reaction solution according to the present invention may be colored by adding a colorant described below in connection with the ink composition and have the function of the reaction solution, as well as the function of the ink composition. When the colorant is a dye, preferably, the reaction solution may further comprise glycerin. The presence of glycerin can more effectively inhibit the occurrence of deposits.

The concentration of the glycerin in the reaction solution may be suitably determined so as to attain the effect of preventing clogging. It, however, is preferably about 0.5 to 40% by weight, more preferably about 2 to 20% by weight, based on the reaction solution (or dye).

According to a preferred embodiment of the present invention, the reaction solution comprises a wetting agent comprising a high-boiling organic solvent. The high-boiling organic solvent serves to prevent the reaction solution from being concentrated due to evaporation, thus preventing clogging of a recording head. Preferred examples of high-boiling organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution comprises a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.5 to 10% by weight, more preferably in the range of from 1.5 to 6% by weight.

According to a preferred embodiment of the present invention, the reaction solution comprises a penetrating agent. Penetrating agents usable herein include various surfactants such as anionic and amphoteric surfactants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

Preferred penetrating agents usable in the present invention include compounds represented by the following formula (1) and lower alcohol ethers of polyhydric alcohols.

(1)

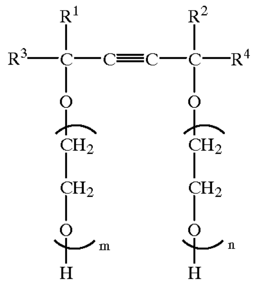

wherein $0 \leq m+n \leq 50$ and $R^1$, $R^2$, $R^3$, and $R^4$ each independently represent an alkyl group.

Specific preferred examples of compounds represented by the formula 1 include OLFINE Y, Surfynol 82, Surfynol 440, Surfynol 465, and Surfynol 485 (all the above products being manufactured by Air Products and Chemicals Inc.) They may be added alone or in a combination of two or more.

According to a preferred embodiment of the present invention, the reaction solution may contain triethanolamine for pH adjustment purposes. When triethanolamine is added, the amount thereof is preferably about 0 to 2.0% by weight.

Ink composition

In the present invention, the term "ink composition" refers to s black ink composition in the case of black-and-white printing and a color ink composition in the case of color printing, specifically a yellow ink composition, a magenta ink composition, and a cyan ink composition and, in addition, a black ink composition for some instances.

The ink composition used in the present invention comprises at least a colorant and water.

The colorant contained in the ink composition of the present invention may be either a dye or a pigment with the pigment being preferred.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added in the form of a pigment dispersion prepared by dispersing the pigment in an aqueous medium with the aid of a dispersant or a surfactant. Preferred dispersants include those commonly used in the preparation, of a dispersion of a pigment, for example, polymeric dispersant.

Preferred examples of dispersant or surfactants usable herein include polyacrylic acid, polymethacrylic acid, acrylic acid/acrylonitrile copolymer, vinyl acetate/acrylic ester copolymer, acrylic acid/alkyl acrylate copolymer, styrene/acrylic acid copolymer, styrene/methacrylic acid copolymer, styrene/acrylic acid/alkyl acrylate copolymer, styrene/methacrylic acid/alkyl acrylate copolymer, styrene/α-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid vinylethylene copolymer, vinyl acetate/maleic ester, vinyl acetate/crotonic acid copolymer, and vinyl acetate/acrylic acid copolymer.

According to a preferred embodiment of the present invention, the weight-average molecular weight of the copolymer is preferably about 3,000 to 50,000, more preferable about 5,000 to 30,000, most preferably about 7,000 to 15,000.

The amount of the dispersant added may be such that the pigment can be stably dispersed without sacrificing the other effects of the present invention. According to a preferred embodiment of the present invention, the amount of the dispersant added is preferably about 1:0.06 to 1:3, more preferably about 1:0.125 to 1:3, in terms of pigment to dispersant ratio.

The amount of pigment added to the ink is preferably about 0.5 to 25% by weight, more preferably about 2 to 15% by weight.

According to a preferred embodiment of the present invention, the ink composition comprises a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin; styrene resin, crosslinked acrylic resin, crosslinked styrene resin, benzoguanamine resin, phenolic resin, silicone resin, and epoxy resin.

According to a preferred embodiment of the present invention., the resin is a polymer having a combination of a hydrophilic segment with a hydrophobic segment. The particle diameter of the resin component is not particularly limited so far as the resin component forms an emulsion. It, however, is preferably not more than about 150 nm, more preferably about 5 to 100 nm.

The resin emulsion may be prepared by subjecting a monomer(s) for forming a contemplated resin to dispersion polymerization in water optionally in the presence of a surfactant. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water optionally in the presence of a surfactant. In general, the ratio of the resin component to the surfactant is preferably about 10:1 to 5:1. When the amount of the surfactant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, and 485 (all the above products being manufactured by Air Products and Chemicals Inc.).

The ratio of the resin as the component constituting the dispersed phase to water is suitably 60 to 400 parts by weight based on 100,parts by weight of the resin with 100 to 200 parts by weight, based on 100 parts by weight of the resin, of water being preferred.

Further, commercially available resin emulsions, may also be used, and examples thereof include Microgel E-1002 and E-5002 (styrene/acrylic resin-emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals., Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

In the ink used in the present invention, the amount of the resin emulsion incorporated therein is preferably such that the amount of the resin component is in the range of from 0.1 to 40% by weight, more preferably in the range of from 1 to 25% by weight.

The resin emulsion has the effect of inhibiting the penetration of a coloring component and, further, accelerating the fixation on the recording medium by virtue of an interaction between the resin emulsion and the polyvalent metal ions. Further, some resin emulsions have an additional effect that they form a film on the recording medium to improve the rubbing resistance of the resultant print.

According to a preferred embodiment of the present invention, the ink composition may contain a thermoplastic resin in the form of a resin emulsion. In this case, the thermoplastic resin has a softening temperature of 50 to 250° C., preferably 60 to 200° C. The term "softening temperature" used herein refers to the lowest temperature among the glass transition temperature of the thermoplastic resin, the melting point of the thermoplastic resin, the temperature which brings the viscosity of the thermoplastic resin to $10^{11}$ to $10^{12}$ poises, the pour point of the thermoplastic resin, and the minimum film forming temperature (MFT) in the form of an emulsion of the thermoplastic resin. In the step of heating according to the method of the present invention, the recording medium is heated to at least the softening temperature of the thermoplastic resin.

Further, preferably, the thermoplastic resin, when heated at the softening or melting temperature or a higher temperature and then cooled, forms a strong film having water resistance and rubbing resistance.

Specific examples of water-insoluble thermoplastic resins include, but not limited to, polyacrylic acid, polymethacrylic acid, an ester of polymethacylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a polyvinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an $\alpha$-olefin/maleic anhydride copolymer, animal and vegetable waxes such as carnauba wax, lanolin, paraffin wax, and microcrystalline wax.

Known resin emulsions may be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

According to a preferred embodiment of the present invention, the ink composition preferably comprises an alginic acid derivative. Preferred examples of alginic acid derivatives include alkali metal salts (for example, sodium salt and potassium salt of alginic acid), organic acid salts (for example, triethanolamine salt) of alginic acid, and ammonium alginate.

The amount of the alginic acid derivative added to the ink composition is preferably about 0.01 to 1% by weight, more preferably about 0.05 to 0.5% by weight Although the reason why a good image can be formed by the addition of an alginic acid derivative has not been elucidated yet, it is considered that the polyvalent metal salt present in the reaction solution reacts with the alginic acid derivative in the ink composition to vary the dispersed state of the colorant, promoting the fixation of the colorant onto the recording medium The ink composition used in the present intention may contain an inorganic oxide colloid. Inorganic oxide colloids usable herein include colloidal silica and alumina colloid. They are generally colloidal solutions prepared by dispersing ultrafine particles of $SiO_2$, $Al_2O_3$ or the like in water or an organic solvent. Commercially available inorganic oxide colloids are generally such that water, methanol, 2-propanol, n-propanol or xylene is used as the dispersant and the diameter of particles of $SiO_2$, $Al_2O_3$ or the like is 5 to 100 nm. Many commercially available colloidal solutions of inorganic oxides do not have pH in a neutral region but pH adjusted to the acidic or alkaline side. This is because the pH region where the inorganic oxide colloid exists stably is on the acidic or alkaline side. Therefore, when the addition of a commercially available inorganic oxide colloidal solution to the ink composition is contemplated, it should be made by taking into consideration the pH, region, where the inorganic oxide colloid exists stably, and the pH value of the ink.

The amount of the inorganic oxide colloid added is preferably about 0.1 to 15% by weight. A plurality of inorganic oxide colloids may be added in combination.

According to a preferred embodiment of the present invention, the ink composition preferably contains an organic solvent. The organic solvent is preferably a low-boiling organic solvent, and preferred examples thereof include methanol, ethanol, n-propyl, alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the ink composition used in the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric, alcohols, such as ethylene glycol, monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink The amount of the low-boiling organic solvent added is preferably 0.5 to 10% by weight, more preferably in the range of from 1.5 to 6% by weight, based on the ink The ink composition used in the present invention may contain a dispersant and a surfactant. Examples of surfactants usable herein include various surfactants described above in connection with the resin emulsion.

According to a preferred embodiment of the present invention the ink composition may contain a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein refers to saccharides, in a broad sense, including substances which widely exist in the natural world, such as alginic acid, $\alpha$-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid, and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, if necessary, pH adjustors, preservatives, antimolds and the like may be added.

Ink jet recording apparatus

An ink jet recording apparatus for practicing the ink jet recording method according to the present invention will now be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. The interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the pump 11 is resorvoired in a waste ink tank 13 through a tube 12.

Figure 2:
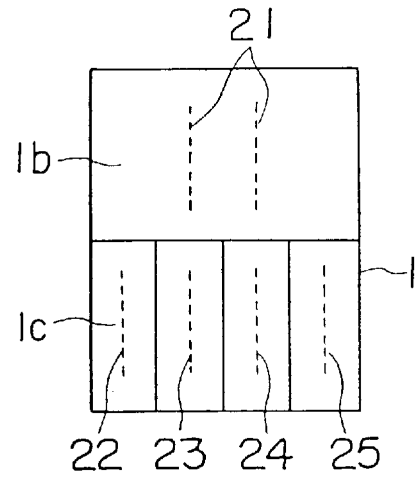
FIG. 2 is an enlarged view showing the surface of nozzles for a recording head, wherein reference character 1*b* designates the surface of a nozzle for a reaction solution and 1*c* the surface of a nozzle for an ink composition.

FIG. 2 is an enlarged view showing the surface of nozzles for the recording head 1. In the drawing, the surface of a nozzle for a reaction solution is indicated by 1*b,* and a nozzle 21 for ejecting the reaction solution is provided in the longitudinal direction. On the other hand, the surface of nozzles for the ink composition is indicated by 1*c,* and a yellow ink composition, a magenta ink composition, a cyan ink composition, and a black ink composition are ejected respectively through nozzles 22, 23, 24 and 25.

Figure 3:
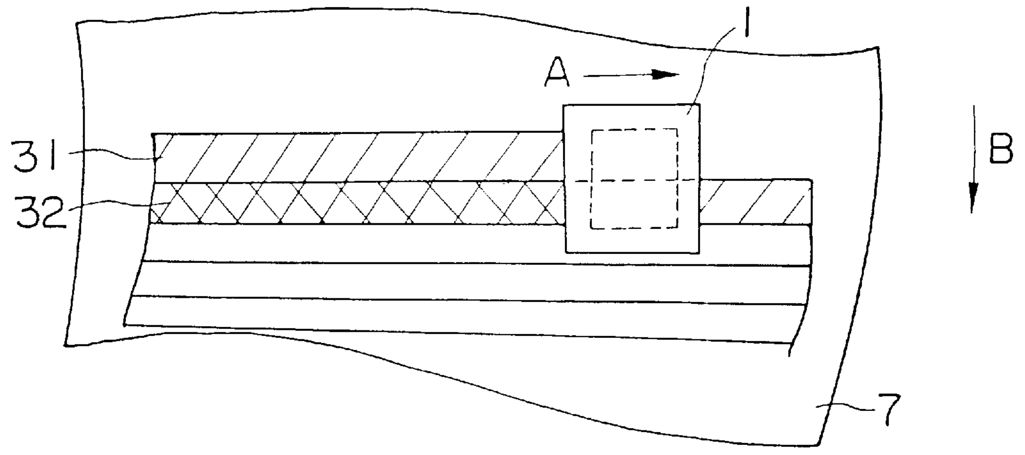
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle 21 to form a reaction solution-deposited region 31 in a band form on the recording medium 7. Subsequently, the recording medium 7 is transferred by a predetermined extent in the direction indicated by an arrow B, during which time the recording head 1 is moved the direction opposite to that indicated by the arrow A and returned to the left end of the recording medium 7, and the recording head conduct printing using the ink composition on the reaction solution-deposited region 31, thereby forming a print region 32.

Figure 4:
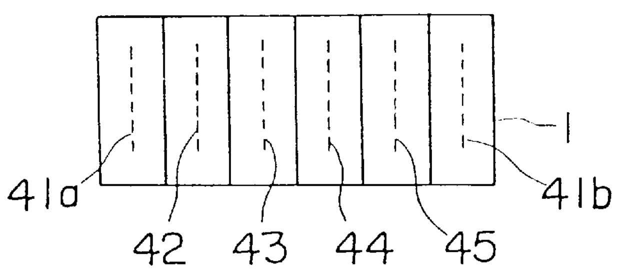
FIG. 4 shows another embodiment of the recording head according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41*a* and 41*b,* and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Further, when the reaction solution and the ink composition are preferably adjusted so as to fall within the surface tension ranges described above, a high-quality print can be more stably provided regardless of the order of deposition of the reaction solution and the ink composition. In this case, even the provision of a single ejection nozzle suffices for satisfactory results. For example, in the drawing, the nozzle 41*b* may be omitted. This can contribute to a further reduction in size of the head and a further increase in printing speed.

Figure 5:
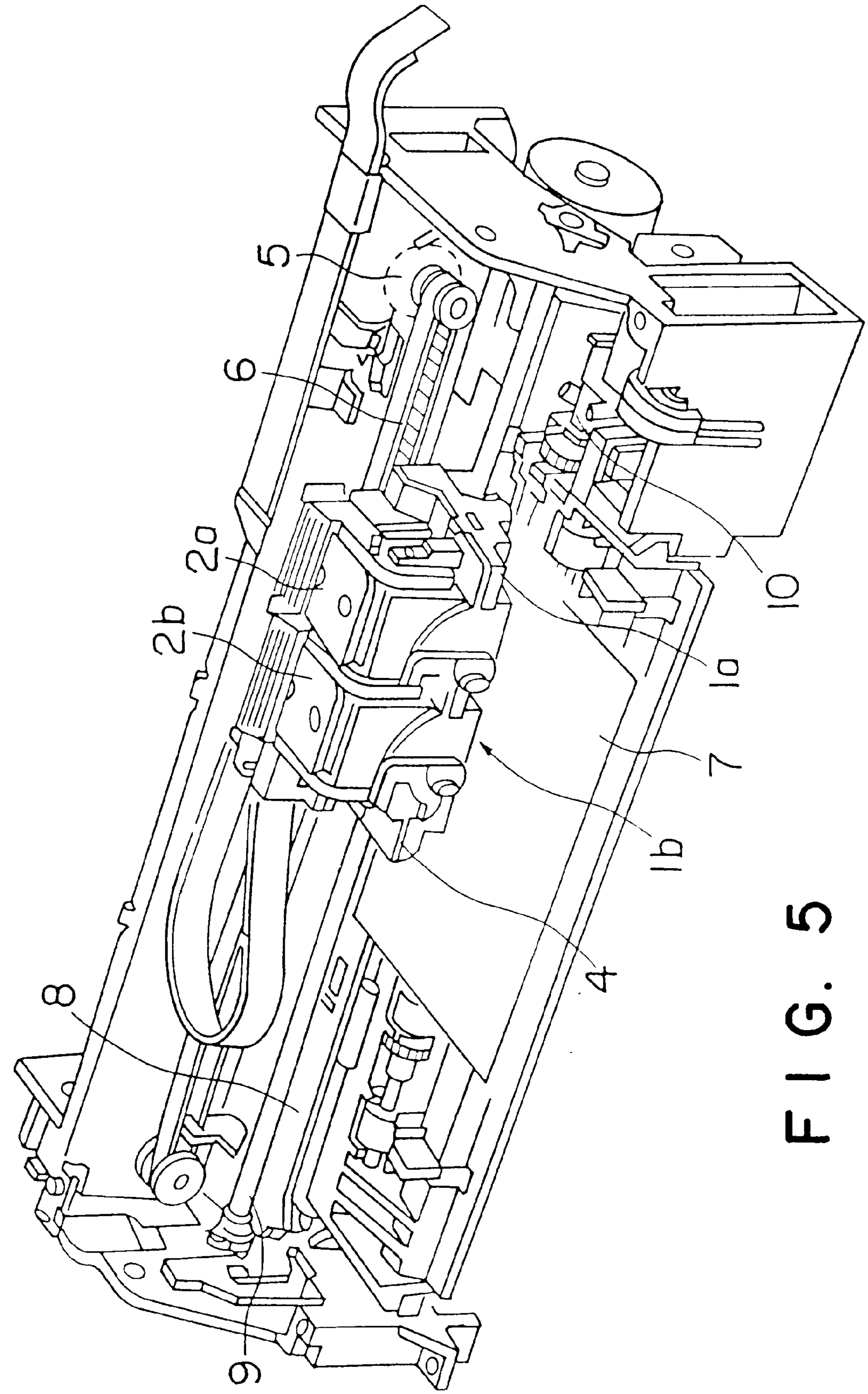
FIG. 5 shows an embodiment of the ink jet recording apparatus according to the present invention, wherein a recording head is integral with an ink tank.

In the ink jet recording apparatus, the supplement of the ink composition may be carried out by replacing an ink tank in a cartridge form. The ink tank may be integral with the recording head. A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1*a* and 1*b* are integral respectively with ink tanks 2*a* and 2*b*. An ink composition and a reaction solution are ejected respectively through the recording heads 1*a* and 1*b*. Basically, printing may be conducted in the same manner as described above in connection with the apparatus shown in FIG. 1. Further, in this embodiment, the recording head 1*a* is moved together with the ink tank 2*a* on a carriage 4, while the recording head 1*a* is moved together with the ink tank 2*b* on the carriage 4.

Figure 6:
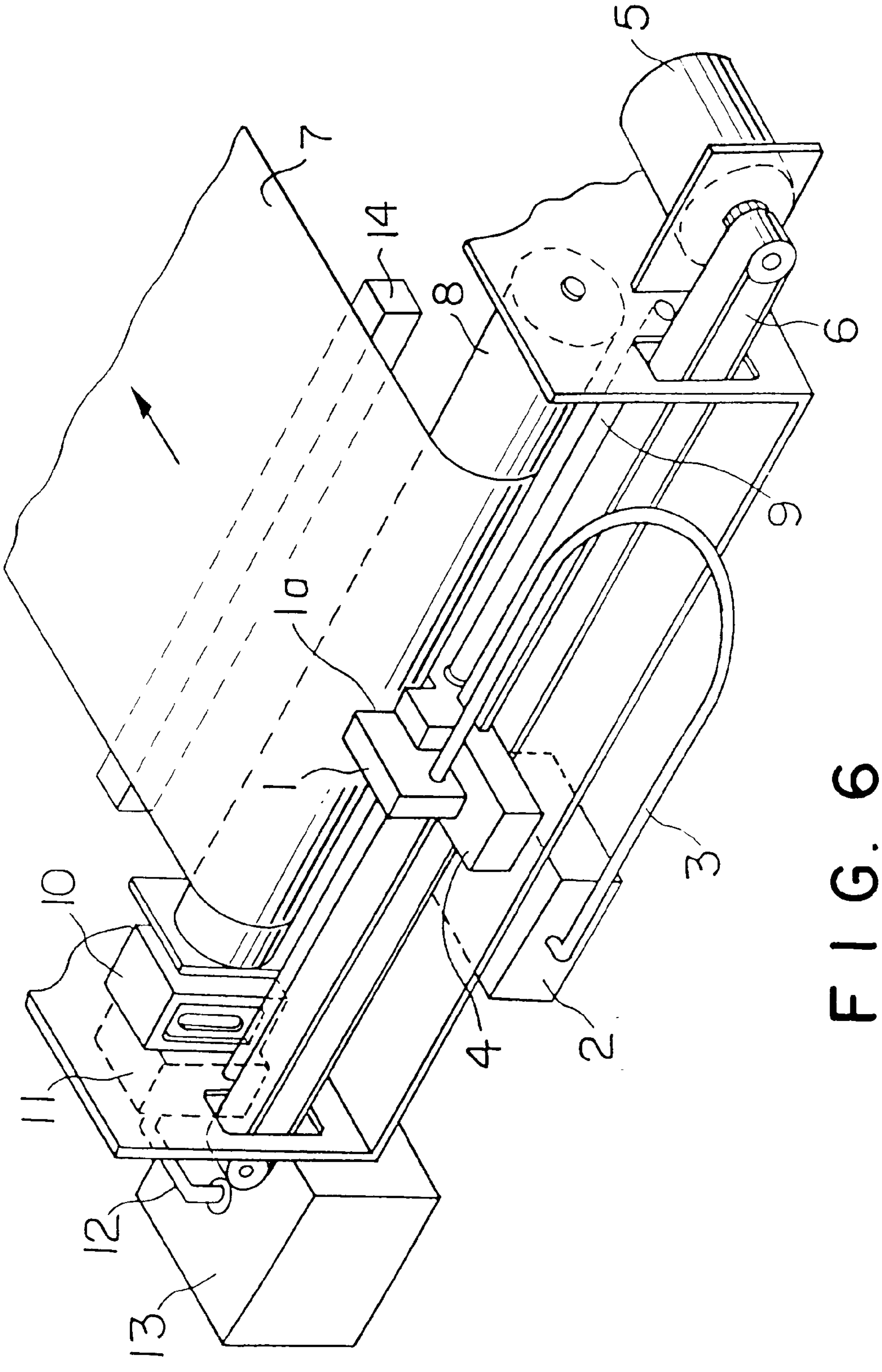
FIG. 6 shows another embodiment of the ink jet recording apparatus according to the present invention, wherein a heater is provided to heat a recording medium after printing.

A preferred embodiment of an ink jet recording apparatus wherein a heater for heating a printed recording medium is further provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heating means may be of a non-contact type where the recording medium is heated by applying infrared rays or the like or blowing hot air to the recording medium.

The reaction solution may be deposited onto the recording medium by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

Further, according to a preferred embodiment of the present invention, the ink jet recording apparatus is preferably such that it can accommodate the reaction solution and the ink composition and, regarding the amounts of the ink composition and the reaction solution, the ink composition is used up earlier than the reaction solution.

Furthermore, according to a preferred embodiment of the present invention, an ink tank for use in the ink jet recording apparatus is provided. The ink tank may be of either a replaceable cartridge type or a type where it is integral with the recording head. In any case, the ink tank is preferably such that it can accommodate the reaction solution and the ink composition and, regarding the amounts of the ink composition and the reaction solution, the ink composition is used up earlier than the reaction solution.

In this connection, it should be noted that when the reaction solution is used up earlier than the ink composition, it is difficult to learn when the reaction solution has been used up because the reaction solution is usually transparent. That is, in this case, that the reaction solution has been used up cannot be learned until the user observes the print and notices a deterioration in print quality, making it necessary for the user to always observe the print quality.

In the ink jet recording apparatus according to the above embodiment, since the ink composition per se is usually in a colored state, it is possible to learn when the ink composition has been used up. Further, since there is no possibility that the reaction solution is used up earlier than the ink composition, ink jet recording wherein two liquids are printed can be stably conducted. The provision of sensor means or the like on the tank section for accommodating the ink composition and the reaction solutions is considered effective for observing the consumption of the liquids. In this case, however, the mechanism, is complicated. In this sense, the above embodiment is advantageous because the use of a simple mechanism suffices for the contemplated purposes.

In the above embodiment, when a plurality of ink compositions are used, the expression “the ink composition is used up earlier than the reaction solution” does not necessarily mean that part of the reaction solution should remain in the tank when all the plurality of ink compositions have been used up so far as part of the reaction solution remains in the tank when any one of the ink compositions has been used up. However, it is preferred that part of the reaction solution remains in the tank when all the plurality of ink compositions have been used up.

EXAMPLES

The present invention will now be described in more detail with reference to the following examples, though it is not limited to these-examples only.

Example A

Preparation of reaction solutions

The following ingredients were mixed together to prepare reaction solutions A1 to A10.

| | |
|---|---|
| Reaction solution A1 | |
| Magnesium nitrate hexahydrate | 5% by weight |
| Glycerin | 20% by weight |
| Triethylene glycol monobutyl ether | 10% by weight |
| 2-Pyrrolidone | 5% by weight |
| Triethanolamine | 0.2% by weight |
| Pure water | Balance |
| Reaction solution A2 | |
| Magnesium nitrate hexahydrate | 5% by weight |
| Glycerin | 20% by weight |
| Triethylene glycol monobutyl ether | 10% by weight |
| 2-Pyrrolidone | 10% by weight |
| Triethanolamine | 0.2% by weight |
| Pure water | Balance |
| Reaction solution A3 | |
| Magnesium nitrate hexahydrate | 5% by weight |
| Glycerin | 20% by weight |
| Diethylene glycol monobutyl ether | 10% by weight |
| 1,3-Dimethyl-2-imidazolidinone | 10% by weight |
| Triethanolamine | 0.2% by weight |
| Pure water | Balance |
| Reaction solution A4 | |
| Magnesium nitrate hexahydrate | 5% by weight |
| Glycerin | 20% by weight |
| Surfynol 465 | 0.7% by weight |
| Thiodiglycol | 5% by weight |
| Triethanolamine | 0.2% by weight |
| Pure water | Balance |
| Reaction solution A5 | |
| Calcium nitrate tetrahydrate | 5% by weight |
| Glycerin | 20% by weight |
| Triethylene glycol monobutyl ether | 10% by weight |
| 2-Pyrrolidone | 5% by weight |
| Triethanolamine | 0.2% by weight |
| Pure water | Balance |

-continued

| | |
|---|---|
| Reaction solution A6 | |
| Acid Yellow 23 | 3.2% by weight |
| Magnesium nitrate hexahydrate | 5% by weight |
| Glycerin | 12% by weight |
| Diethylene glycol monobutyl ether | 3% by weight |
| Surfynol 465 | 0.7% by weight |
| Diethylene glycol | 4% by weight |
| 2-Pyrrolidone | 5% by weight |
| Triethanolamine | 0.1% by weight |
| Pure water | Balance |
| Reaction solution A7 | |
| Reactive Red 180 | 4.2% by weight |
| Magnesium nitrate hexahydrate | 5% by weight |
| Glycerin | 17% by weight |
| Diethylene glycol monobutyl ether | 3% by weight |
| Surfynol 465 | 0.7% by weight |
| Diethylene glycol | 4% by weight |
| 2-Pyrrolidone | 5% by weight |
| Triethanolamine | 0.9% by weight |
| Pure water | Balance |
| Reaction solution A8 | |
| Acid Blue 9 | 1.5% by weight |
| Direct Blue 199 | 3.5% by weight |
| Magnesium nitrate hexahydrate | 5% by weight |
| Glycerin | 12% by weight |
| Diethylene glycol monobutyl ether | 3% by weight |
| Surfynol 465 | 0.7% by weight |
| Diethylene glycol | 4% by weight |
| 2-Pyrrolidone | 5% by weight |
| Triethanolamine | 0.1% by weight |
| Pure water | Balanoe |
| Reaction solution A9 | |
| Magnesium nitrate hexahydrate | 5% by weight |
| Glycerin | 20% by weight |
| Triethylene glycol monobutyl ether | 10% by weight |
| Triethanolamine | 0.2% by weight |
| Pure water | Balance |
| Reaction solution A10 | |
| Calcium nitrate tetrahydrate | 5% by weight |
| Glycerin | 20% by weight |
| Triethylene glycol monobutyl ether | 10% by weight |
| Triethanolamine | 0.2% by weight |
| Pure water | Balance |
| Preparation of ink composition | |
| Black ink A1 | |
| Carbon black MA7 (manufactured by Mitsubishi Kasei Corp.) | 5% by weight |
| Styrene/acrylic acid copolymer (dispersant) | 1% by weight |
| Sucrose | 0.7% by weight |
| Maititol | 6.3% by weight |
| Glycerin | 10% by weight |
| 2-Pyrrolidone | 2% by weight |
| Ethanol | 4% by weight |
| Pure water | Balance |

Carbon black and the dispersant were mixed together and dispersed by means of a sand mill (manufactured by Yasukawta Seisakusho) with glass beads (diameter: 1.7 mm, amount: 1.5 times, by weight, the amount of the mixture) for 2 hr. Thereafter, the glass beads were removed, and the remaining additives were added, and the mixture was stirred at room temperature for 20 min and then filtered through a 5-$\mu$m, membrane filter to prepare a black ink for ink jet recording Evaluation of reaction solution A Evaluation A1: Amount of deposit produced The reaction solution was placed in a teflon bottle which was then hermetically sealed. In this state, the reaction solution was allowed to stand at 70° C. for one week. After the standing, 10 ml of the reaction solution was passed through a 10-μm mesh filter to collect deposits produced during the standing. The results are tabulated in Table 1. Regarding the results given in the table, the evaluation criteria are as follows.

A: Number of collected deposits less than 20

B: Number of collected deposits, 20 to less than 100

C: Number of collected deposits, not less than 100

Evaluation A2: Printing stability

The reaction solution was filled into an ink cartridge for MJ-500C (manufactured by Seiko Epson Corporation), and this ink cartridge was then loaded onto the printer. A pattern containing a combination of characters with graphics was printed on 10000 sheets of paper of size A4, during which time inspection was made for "ejection of ink droplets with trajectories non-perpendicular to the print head" or "drop-out."

Since the reaction solutions 1 to 5 were transparent, they were colored by adding 0.5% by weight of Acid Blue 9 (dye) thereto so that "ejection of ink droplets with trajectories non-perpendicular to the print head" and "dropout" could be easily confirmed.

The results were tabulated in Table 1. Regarding the results given in the table, the evaluation criteria are as follows.

A: Number of times of "ejection of ink droplets with trajectories non-perpendicular to the print head" or "dropout", less than 20

B: Number of times of "ejection of ink droplets with trajectories non-perpendicular to the print head" or "dropout", 20 to less than 50

C: Number of times of "ejection of ink droplets with trajectories non-perpendicular to the print head" or "dropout", not less than 50

Evaluation A3: Print quality (feathering)

Printing was carried out on the following various papers using an ink jet printer MJ-500C. In the printing, the reaction solution was first printed (100% duty), and the black ink A1 was then used to print a letter. After drying, the prints were inspected for feathering in the letter.

(1) Xerox P Paper (Xerox Corp.)

(2) Ricopy 6200 Paper (Ricoh Co. Ltd.)

(3) Xerox 4024 Paper (Xerox Corp.)

(4) Neenah Bond Paper (Kimberly-Clark)

(5) Xerox R Paper (Xerox Corp., recycled paper)

(6) Yamayuri (Honshu Paper Co., Ltd., recycled paper)

The results were as tabulated in Table 1. Regarding the results given in the table, the evaluation criteria are as follows.

A: Sharp print without any feathering

B: Feathering observed

C: Remarkable feathering to render the outline of the letter blurry

TABLE 1

| | Reaction solution | Evaluation A1 | Evaluation A2 | Evaluation A3 |
|---|---|---|---|---|
| Ex. | | | | |
| A1 | A1 | A | B | A |
| A2 | A2 | A | A | A |
| A3 | A3 | B | B | A |
| A4 | A4 | A | B | A |
| A5 | A5 | A | B | A |
| A6 | A6 | B | B | B |
| A7 | A7 | B | B | B |
| A8 | A8 | B | B | B |
| Comp. Ex. | | | | |
| A1 | A9 | C | C | A |
| A2 | A10 | C | C | A |

Example B

Preparation of reaction solution

The following ingredients were mixed together to prepare reaction solutions B1 to B10.

| | |
|---|---|
| Reaction solution B1 | |
| Magnesium nitrate hexahydrate | 25% by weight |
| Triethylene glycol monobutyl ether | 10% by weight |
| Glycerin | 20% by weight |
| Aqueous ammonia (29% aqueous solution) | 0.05% by weight |
| Pure water | Balance |
| The above ingredients were mixed together, and the mixture was stirred at room temperature for one hr to prepare a composition which was then subjected to suction filtration through a 5-μm membrane filter to prepare a reaction solution. | |
| Reaction solution B2 | |
| Magnesium nitrate hexahydrate | 25% by weight |
| Triethylene glycol monobutyl ether | 10% by weight |
| Glycerin | 20% by weight |
| Aqueous ammonia (29% aqueous solution) | 0.2% by weight |
| Pure water | Balance |
| Reaction solution B3 | |
| Magnesium nitrate hexahydrate | 25% by weight |
| Triethylene glycol monobutyl ether | 10% by weight |
| Glycerin | 20% by weight |
| Cyclohexylamine | 0.1% by weight |
| Pure water | Balance |
| Reaction solution B4 | |
| Magnesium nitrate hexahydrate | 25% by weight |
| Triethylene glycol monobutyl ether | 10% by weight |
| Glycerin | 20% by weight |
| N-Cyclohexyl-N-dodecylamine | 0.1% by weight |
| Pure water | Balance |
| Reaction solution B5 | |
| Magnesium nitrate hexahydrate | 25% by weight |
| Triethylene glycol monobutyl ether | 10% by weight |
| Glycerin | 20% by weight |
| Decamethyleneimine | 0.1% by weight |
| Pure water | Balance |
| Reaction solution B6 | |
| Magnesium nitrate hexahydrate | 25% by weight |
| Triethylene glycol monobutyl ether | 10% by weight |
| Glycerin | 20% by weight |
| Dicyclohexylamine nitrite | 0.1% by weight |
| Pure water | Balance |
| Reaction solution B7 | |
| Magnesium nitrate hexahydrate | 25% by weight |
| Triethylene glycol monobutyl ether | 10% by weight |
| Glycerin | 20% by weight |
| Dioctylamine | 0.1% by weight |
| Heptanoic acid | 0.1% by weight |
| Pure water | Balance |

-continued

| | |
|---|---|
| Reaction solution B8 | |
| Calcium nitrate tetrahydrate | 20% by weight |
| Triethylene glycol monobutyl ether | 10% by weight |
| Glycerin | 20% by weight |
| Aqueous ammonia (29%) | 0.2% by weight |
| Pure water | Balance |
| Reaction solution B9 | |
| Magnesium nitrate hexahydrate | 25% by weight |
| Triethylene glycol monobutyl ether | 10% by weight |
| Glycerin | 20% by weight |
| Pure water | Balance |
| Reaction solution B10 | |
| Calcium nitrate tetrahydrate | 20% by weight |
| Triethylene glycol monobutyl ether | 10% by weight |
| Glycerin | 20% by weight |
| Pure water | Balance |
| Preparation of ink composition | |
| Black ink B1 | |
| Carbon black MA7 (manufactured by Mitsubishi Kasei Corp.) | 5% by weight |
| Styrene/acrylic acid copolymer (dispersant) | 1% by weight |
| Voncoat 4001 (acrylic resin emulsion resin component: 50%, MFT = 5° C. manufactured by Dainippon Ink and Chemicals, Inc.) | 3% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Carbon black and the dispersant were mixed together and dispersed by means of a sand mill (manufactured by Yasukawa Seisakusho) with glass beads (diameter: 1–7 mm, amount: 1.5 times, by weight, the amount of the mixture) for 2 hr. Thereafter, the glass beads were removed, and the remaining additives were added and the mixture was stirred at room temperature for 20 min and then filtered through a 5-$\mu$m membrane filter to prepare an ink for ink jet recording.

Evaluation of reaction solution

Evaluation B1: Print quality (feathering)

An ink jet printer MJ-500C (manufactured by Seiko Epson Corporation) was used to perform printing on the following various papers. In the printing, the reaction solution was first printed (100% duty), and the black ink B1 was then used to print a letter. After drying, the prints were inspected for feathering in the letter.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (recycled paper, Xerox Corp.)
(6) Yamayuri (recycled paper, Honshu Paper Co., Ltd.)

The results were as tabulated in Table 2. Regarding the results given in the table, the evaluation criteria are as follows.

A: Sharp print without any feathering
B: Feathering observed
C: Remarkable feathering observed rendering the outline of the letter blurry Evaluation B2: Clogging A head of an ink jet printer MJ-500C was filled with the reaction solution, and alphanumeric characters were continuously printed for 10 min. Thereafter, the printer was stopped and allowed to stand without capping under an environment of 40° C. and 25Rh for one month. Thereafter, the printing of alphanumeric characters was resumed. In this case, the number of cleaning operations necessary for providing a print having a quality equal to that before standing was determined. The results were as tabulated in Table 2. regarding the results given in the table, the evaluation criteria are as follows.

A: 0 to 2 times
B: 3 to 5 times
C: Impossible to provide prints having a quality equal to the quality of the print before standing even after 6 or more repeated cleaning operations Evaluation B3 Ejection stability A head of an ink jet printer MJ-500C was filled with the reaction solution, and alphanumeric characters were continuously printed on paper of size A4. In this case, when ink droplets were ejected with trajectories non-perpendicular to the print head, cleaning operation was performed. When the ejection of ink droplets with trajectories non-perpendicular to the print head could not be corrected by the cleaning operation, the number of sheets of paper used for printing up to this point was measured as a parameter of the ejection stability.

The results were as tabulated in Table 2. Regarding the results given in the table, the evaluation criteria are as follows.

C: Not more than 5000 sheets
B: Not more than 10000 sheets
A: Not less than 10000

TABLE 2

| | Reaction solution | Evaluation B1 | Evaluation B2 | Evaluation B3 |
|---|---|---|---|---|
| Ex. | | | | |
| B1 | B1 | A | A | A |
| B2 | B2 | A | A | A |
| B3 | B3 | A | A | B |
| B4 | B4 | A | A | B |
| B5 | B5 | A | A | A |
| B6 | B6 | A | A | A |
| B7 | B7 | A | A | B |
| B8 | B8 | A | A | A |
| Comp. Ex. | | | | |
| B1 | B9 | A | A | C |
| B2 | B10 | A | B | C |

Example C

Preparation of reaction solution

The following ingredients were mixed together to prepare reaction solutions C1 to C5.

| | |
|---|---|
| Reaction solution C1 | |
| Swanol CA-2150 (lauryltrimethylammonium chloride, solid content 50%, manufactured by Nikko Chemicals Co., Ltd.) | 10% by weight |
| Magnesium nitrate hexahydrate | 5% by weight |
| Glycerin | 10% by weight |
| Triethanolamine | 0.2% by weight |
| Pure water | Balance |
| Reaction solution C2 | |
| Swanol CA-2350 (cetyltrimethylammonium chloride, | 10% by weight |

-continued

| | |
|---|---|
| solid content 50%, manufactured by Nikko Chemicals Co., Ltd.) | |
| Calcium nitrate tetrahydrate | 5% by weight |
| Glycerin | 10% by weight |
| Triethanolamine | 0.2% by weight |
| Pure water | Balance |
| Reaction solution C3 | |
| Swanol CA-3080 (dioctyldimethylammonium chloride, solid content 80%, manufactured by Nikko Chemicals Co., Ltd.) | 3% by weight |
| Magnesium acetate tetrahydrate | 5% by weight |
| Glycerin | 10% by weight |
| Triethanolamine | 0.2% by weight |
| Pure water | Balance |
| Reaction solution C4 | |
| Cation M2-100 (octadecyldimethylbenzylammonium chloride, manufactured by Nippon Oils & Fats Co., Ltd.) | 5% by weight |
| Calcium acetate monohydrate | 5% by weight |
| Glycerin | 10% by weight |
| Triethanolamine | 0.2% by weight |
| Pure water | Balance |
| Reaction solution C5 | |
| Cation SA (octadecylamine acetate, manufactured by Nippon Oils & Fats Co., Ltd.) | 5% by weight |
| Calcium formate (anhydride) | 5% by weight |
| Glycerin | 10% by weight |
| Triethanolamine | 0.2% by weight |
| Pure water | Balance |
| Preparation of ink composition | |
| Black ink C1 | |
| Carbon black Raven 1080 (manufactured by Columbian Carbon) | 5% by weight |
| Styrene/acrylic acid copolymer (dispersant) | 1% by weight |
| Voncoat 4001 (acrylic resin emulsion, resin component content 50%, manufactured by Dainippon Ink and Chemicals, Inc.) | 5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Carbon black and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed, and the remaining ingredient were added, and the mixture was stirred at room temperature for 20 min and then filtered through a 5-μm membrane filter to prepare an ink composition for ink jet recording.

Color ink set C1 composed of the following black ink C2 and the following yellow, cyan, and magenta ink compositions were prepared in the same manner as described above in connection with the preparation of the black ink C1.

| | |
|---|---|
| Black ink C2 | |
| Carbon black MA7 (manufactured by Mitsubishi Chemical Industries) | 5% by weight |
| Styrene/acrylic acid copolymer (dispersant) | 1% by weight |
| Voncoat 5454 (Styrene/acrylic resin emulsion, resin component content 45% manufactured by Dainippon Ink and Chemicals, Inc.) | 5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Color ink set C1 | |
| A yellow ink, a magenta ink, and a cyan ink were prepared using the following colorants (pigments) and liquid medium. | |
| <Pigment> | |
| Yellow ink Pigment: KETYELLOW 403 (manufactured by Dainippon Ink and Chemicals, Inc.) | 2% by weight |
| Magenta ink Pigment: KETRED 309 (manufactured by Dainippon Ink and Chemicals, Inc.) | 2% by weight |
| Cyan ink Pigment: KETBLUEEX-1 (manufactured by Dainippon Ink and Chemicals, Inc.) | 2% by weight |
| <Liquid medium> | |
| Styrene/acrylic acid copolymer (dispersant) | 0.4% by weight |
| Voncoat 4001 | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Print evaluation test

Printing was performed by means of an ink jet printer using the above ink compositions and the reaction solutions in combination as specified in the following Table 3 to evaluate print quality and the like.

Evaluation C1: Print quality (feathering)

The print quality was evaluated according to evaluation A3. The results were as tabulated in Table 3.

Evaluation C2: Print quality (OD value)

The reaction solution was printed (100% duty) by means of an ink jet printer MJ-700V2C on the papers used in evaluation C1, and letters were then printed thereon using the black ink. After drying, the reflection OD value of the prints was measured with Macbeth PCMII (manufactured by Macbeth).

The results were as tabulated in the following Table 3.

Evaluation C3: Uneven printing

Printing was performed (100% duty) by means of an ink jet printer MJ-700V2C.

(1) Ricopy 6200 Paper (Ricoh Co. Ltd.)

(2) Canon PB PAPER (Canon Inc.)

The OD of randomly selected five points in the print area was; measured with Macbeth PCMII, and the average of the measured values was determined. This procedure was repeated five times, and the maximum value and the minimum value in the five average values were determined. When the difference between the maximum value and the minimum value is less than 0.5, there is no problem for practical use with the difference being preferably less than 0.4.

The results were as tabulated in Table 3. In the results given in the table, the evaluation criteria were as follows.

A: OD difference of less than 0.2

B: OD difference of 0.2 to less than 0.4

C: OD difference of not less than 0.4

Evaluation C4: Color bleed

An ink jet printer MJ-700V2C was used in this evaluation test. The reaction solution was deposited (100% duty) on the papers used in the evaluation A3 Thereafter, each ink composition in the color ink set C1 was then printed (100% duty), and printing of letters was simultaneously performed using the black ink C1 or C2. The prints were visually inspected for the presence of uneven color-to-color mixing in the letter boundaries.

The results were as tabulated in Table 3. In the results given in the table, the evaluation criteria were as follows.

A: No color-to-color mixing observed with clear letter boundaries

B: Feather-like color-to-color mixing observed

C: Significant color-to-color mixing observed rendering the outline of the letter blur

TABLE 3

| | Reaction solution | Black ink | Evaluation C1 | Evaluation C2 | Evaluation C3 | Evaluation C4 |
|---|---|---|---|---|---|---|
| Ex. | | | | | | |
| C1 | C1 | 1 | A | 1.41 | A | — |
| C2 | C1 | 2 | A | 1.43 | A | — |
| C3 | C2 | 2 | A | 1.43 | A | — |
| C4 | C3 | 2 | A | 1.45 | A | — |
| C5 | C4 | 1 | A | 1.45 | A | — |
| C6 | C4 | 2 | A | 1.48 | A | A |
| C7 | C5 | 2 | A | 1.46 | A | A |
| Comp. Ex. | | | | | | |
| C1 | — | 2 | B | 1.33 | B | C |

What is claimed is:

1. In a reaction solution for use in ink jet recording wherein a reaction solution and an ink composition are deposited onto a recording medium with a colorant being provided in the ink composition and not in the reaction solution, the reaction solution comprising a polyvalent metallic salt, the improvement wherein the reaction solution comprises a component selected from the group consisting of a five-or six-membered saturated or unsaturated heterocyclic compound containing at least one nitrogen atom, an optionally alkyl-substituted amide derivative, a sulfur-containing compound, an amine, and a cationic surfactant.

2. The reaction solution according to claim 1, wherein the five- or six-membered saturated or unsaturated heterocyclic compound containing at least one nitrogen atom, the optionally alkyl-substituted amide derivatives or the sulfur-containing compound is selected from pyridine, 2-pyrrolidone, 1,3-dimethy-2-imidazolidinone, and thiodiglycol.

3. The reaction solution according to claim 1, wherein the amine is ammonia.

4. The reaction solution according to claim 3, wherein ammonia has a concentration of not more than 0.5% by weight.

5. The reaction solution according to claim 1, wherein the amine is a primary, secondary, or tertiary amine containing a saturated or unsaturated hydrocarbon radical having 12 to 18 carbon atoms.

6. The reaction solution according to claim 1, wherein the amine contained in the reaction solution is a cyclic imine.

7. The reaction solution according to claim 5, wherein the amine contained in the reaction solution is in the form of a salt of an inorganic acid or an amide derivative.

8. The reaction solution according to claim 1, wherein the amine has a vapor pressure of larger than 0.01 Pa at 25° C.

9. The reaction solution according to claim 1, wherein the cationic surfactant contains one quaternary nitrogen atom in its molecule structure.

10. The reaction solution according to claim 9, wherein at least two substituents bonded to the quaternary nitrogen atom in the molecule structure of the cationic surfactant each contain six or more carbon atoms.

11. The reaction solution according to claim 10, wherein the cationic surfactant is represented by the following formula (I):

$$R^1R^2R^3R^4N^+X^- \quad (I)$$

wherein $R^1$ and $R^2$ each independently represent a $C_8$–$C_{20}$ alkyl, benzyl, or phenyl group, $R^3$ and $R^4$ each independently represent a $C_1$–$C_4$ alkyl group, and $X^-$ represents a counter ion.

12. The reaction solution according to claim 1, wherein the polyvalent metallic salt is a salt of nitric acid or a salt of carboxylic acid.

13. An ink jet recording method comprising the step of depositing a reaction solution according to claim 1 and an ink composition onto a recording medium.

14. The ink jet recording method according to claim 13, wherein the ink composition comprises a colorant and a resin emulsion.

15. The ink jet recording method according to claim 14, wherein the colorant contained in the ink composition is a pigment.

16. The ink jet recording method according to claim 15, wherein the reaction solution is deposited onto a recording medium followed by printing of the ink composition on the recording medium.

17. The ink jet recording method according to claim 13, wherein the ink composition is deposited onto a recording medium followed by deposition of the reaction solution onto the recording medium.

18. The ink jet recording method according to claim 13, wherein the reaction solution and the ink composition are mixed together immediately before or immediately after ejection from an ink jet recording apparatus followed by printing on a recording medium.

19. A record printed by the method according to claim 13.

20. A combination comprising the reaction solution of claim 1 and an ink composition comprising a colorant, the reaction solution consisting essentially of the polyvalent metallic salt, the component, an organic solvent, and water.

* * * * *